US008601786B2

(12) United States Patent
Hurwitz et al.

(10) Patent No.: US 8,601,786 B2
(45) Date of Patent: Dec. 10, 2013

(54) OPERATIONAL LINE MANAGEMENT OF LOW PRESSURE COMPRESSOR IN A TURBOFAN ENGINE

(75) Inventors: Wayne Hurwitz, West Hartford, CT (US); William J. McVey, North Granby, CT (US)

(73) Assignee: United Technologies Corporation, Hartford, CT (US)

( * ) Notice: Subject to any disclaimer, the term of this patent is extended or adjusted under 35 U.S.C. 154(b) by 950 days.

(21) Appl. No.: 12/441,594

(22) PCT Filed: Oct. 12, 2006

(86) PCT No.: PCT/US2006/039808
§ 371 (c)(1),
(2), (4) Date: Mar. 17, 2009

(87) PCT Pub. No.: WO2008/045058
PCT Pub. Date: Apr. 17, 2008

(65) Prior Publication Data
US 2010/0058735 A1 Mar. 11, 2010

(51) Int. Cl.
*F02C 9/28* (2006.01)
*F02K 1/12* (2006.01)
*F02K 3/075* (2006.01)

(52) U.S. Cl.
USPC ......... 60/39.091; 73/112.06; 60/242; 60/771; 60/226.3

(58) Field of Classification Search
USPC ................ 60/770, 771, 226.3, 242, 269, 776, 60/39.091, 782, 785, 795; 239/265.19; 73/112.06
See application file for complete search history.

(56) References Cited

U.S. PATENT DOCUMENTS

| | | | | |
|---|---|---|---|---|
| 2,873,576 A * | 2/1959 | Lombard | ...................... | 60/226.3 |
| 2,941,399 A * | 6/1960 | Bersinger | .................. | 73/112.04 |
| 3,267,669 A * | 8/1966 | Tissier | ........................ | 60/39.281 |
| 3,401,524 A * | 9/1968 | Urban | ............................. | 60/224 |
| 3,472,027 A * | 10/1969 | Snow et al. | ..................... | 60/236 |
| 3,523,423 A | 8/1970 | Young | | |
| 3,932,058 A * | 1/1976 | Harner et al. | ................... | 416/28 |
| 3,971,208 A * | 7/1976 | Schwent | ......................... | 60/773 |
| 4,060,980 A * | 12/1977 | Elsaesser et al. | ............... | 60/773 |

(Continued)

FOREIGN PATENT DOCUMENTS

EP 0 005 135 10/1979

OTHER PUBLICATIONS

International Search Report for PCT Application No. PCT/US2006/039808.

*Primary Examiner* — William H Rodriguez
*Assistant Examiner* — Carlos A Rivera
(74) *Attorney, Agent, or Firm* — Carlson, Gaskey & Olds, P.C.

(57) ABSTRACT

A turbofan engine control system is provided for managing a low pressure compressor operating line. The engine includes a low spool having a low pressure compressor housed in a core nacelle. A turbofan is coupled to the low spool. A fan nacelle surrounds the turbofan and core nacelle and provides a bypass flow path having a nozzle exit area. A controller is programmed to effectively change the nozzle exit area in response to an undesired low pressure compressor stability margin which can result in a stall or surge condition. In one example, the physical nozzle exit area is decreased at the undesired stability condition occurring during engine deceleration. A low pressure compressor pressure ratio, low spool speed and throttle position are monitored to determine the undesired stability margin.

15 Claims, 3 Drawing Sheets

(56) References Cited

U.S. PATENT DOCUMENTS

| | | |
|---|---|---|
| 4,104,876 A | 8/1978 | Larsen et al. |
| 4,130,872 A | 12/1978 | Haloff |
| 4,467,600 A * | 8/1984 | Peikert .......................... 60/204 |
| 6,141,951 A * | 11/2000 | Krukoski et al. ............... 60/772 |
| 6,513,333 B2 * | 2/2003 | Sugitani ......................... 60/773 |
| 8,313,280 B2 * | 11/2012 | Hurwitz et al. .................. 415/1 |
| 2008/0264067 A1 * | 10/2008 | Flucker et al. ................. 60/793 |

* cited by examiner

US 8,601,786 B2

OPERATIONAL LINE MANAGEMENT OF LOW PRESSURE COMPRESSOR IN A TURBOFAN ENGINE

BACKGROUND OF THE INVENTION

This application claims priority to PCT Application Serial No. PCT/US2006/039808, filed on Oct. 12, 2006.

This invention relates to a turbofan engine, and more particularly, the invention relates to managing the operational line of a low pressure compressor.

A typical turbofan engine includes low and high spools. The low spool is coupled to a turbofan and typically supports a low pressure turbine and low pressure compressor. The high spool rotates relative to the low spool and typically supports a high pressure compressor downstream of the low pressure compressor and is coupled to a high pressure turbine upstream of the low pressure turbine. The spools, turbine and compressor are housed in a core nacelle. The turbofan is arranged upstream from the core nacelle. A fan nacelle surrounds the turbofan and core nacelle to provide a bypass flow path.

Maintaining aerodynamic stability of the low pressure compressor is a significant factor for overall engine performance, in particular for large commercial high bypass flow engines. The low pressure compressor operating characteristics are set to maintain a sufficient stability margin for the compressor at all operating conditions, including throttle transients. A limitation on the stability margin is an increase in low pressure compressor pressure ratio that occurs during throttle transients. During a deceleration, the high spool pressurizes the low pressure compressor while the turbofan and low pressure compressor depressurize. This results in a momentary increase in the low pressure compressor pressure ratio, which raises the low pressure compressor operating line and reduces stability margin until the high spool decelerates.

Typically, the nominal low pressure compressor operating line is set such that sufficient stability margin is maintained during deceleration throttle transients. This can result in the low pressure compressor being operated at non-optimal performance conditions. What is needed is a turbofan engine that maintains a desired operating line for the low pressure compressor that maximizes performance and ensures sufficient stability margin for throttle transients throughout the flight envelope.

SUMMARY OF THE INVENTION

A turbofan engine control system is provided for managing a low pressure compressor operating line. The engine includes a low spool having a low pressure compressor housed in a core nacelle. A turbofan is coupled to the low spool. A fan nacelle surrounds the turbofan and core nacelle and provides a bypass flow path having a nozzle exit area. A controller is programmed to effectively change the nozzle exit area in response to an undesired low pressure compressor stability margin above which a stall or surge condition may result. In one example, the physical nozzle exit area is decreased at the undesired stability condition occurring during engine deceleration. In one example, a low pressure compressor pressure ratio, low spool speed and throttle position are monitored to determine the undesired stability margin.

These and other features of the present invention can be best understood from the following specification and drawings, the following of which is a brief description.

DETAILED DESCRIPTION OF THE PREFERRED EMBODIMENT

Figure 1:
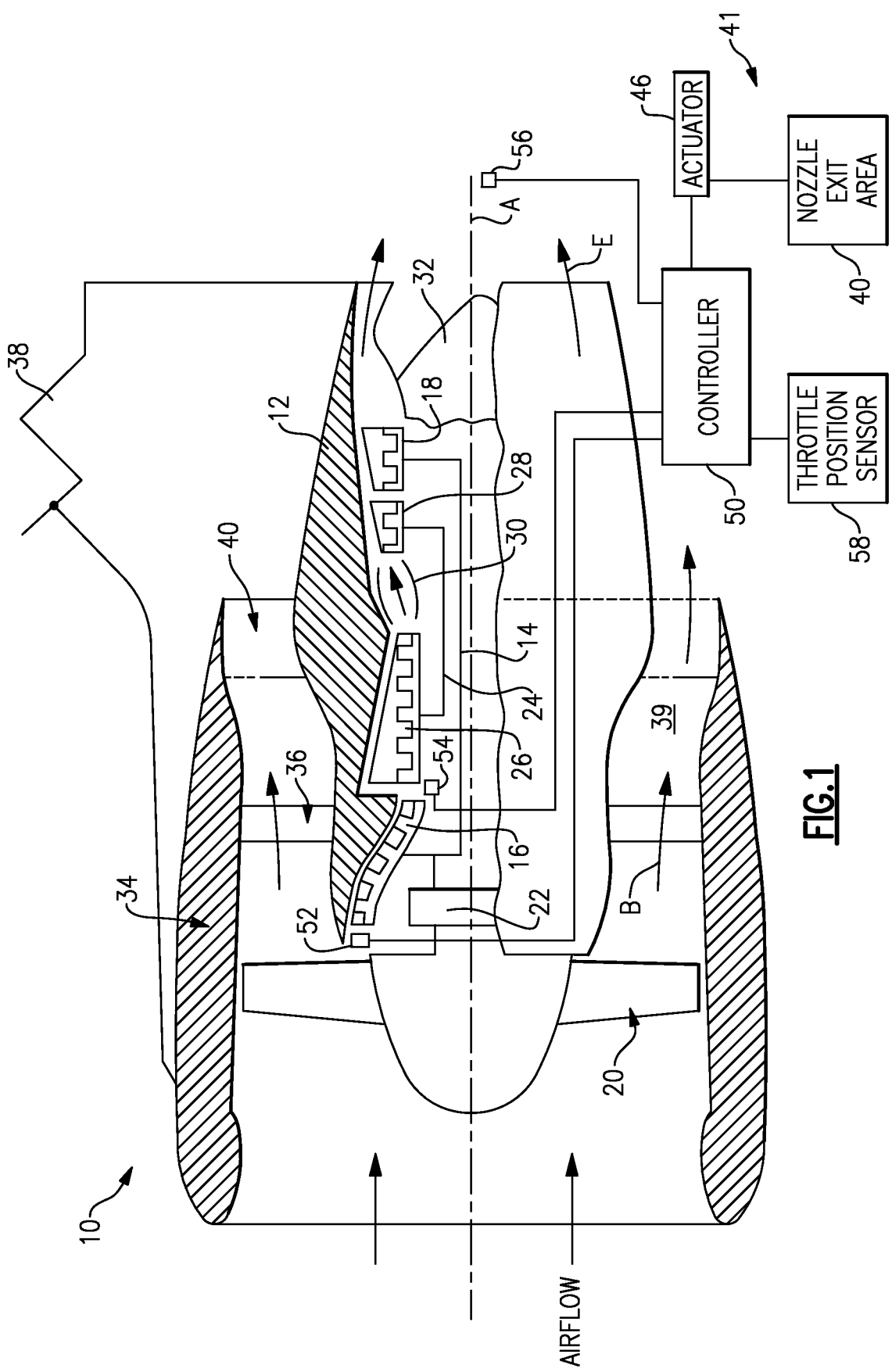
FIG. 1 is a cross-sectional view of an example turbofan engine.

A geared turbofan engine 10 is shown in FIG. 1. A pylon 38 mounts the engine 10 to an airplane. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10, and the turbofan diameter is substantially larger than the diameter of the low pressure compressor 16. The low pressure turbine 18 has a pressure ratio that is greater than 5, in one example. The gear train 22 is an epicycle gear train, for example, a star gear train, providing a gear reduction ratio of greater than 2.5. It should be understood, however, that the above parameters are only exemplary of a contemplated geared turbofan engine. That is, the invention is applicable to other engines.

Airflow enters a fan nacelle 34, which surrounds the core nacelle 12 and turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 that is used to effectively change the nozzle exit area. In one example, the flow control device 41 provides the fan nozzle exit area 40 for discharging axially the bypass flow B pressurized by the upstream turbofan 20 of the engine 10. A significant amount of thrust is provided by the bypass flow B due to the high bypass ratio. The turbofan 20 of the engine 10 is designed for a particular flight condition, typically cruise at 0.8M and 35,000 feet. The turbofan 20 is designed at a particular fixed stagger angle for an efficient cruise condition. The flow control device 41 is operated to vary the nozzle exit area 40 to adjust fan bypass air flow such that the angle of attack or incidence on the fan blade is maintained close to design incidence at other flight conditions, such as landing and take-off. This enables desired engine operation over a range of flight conditions with respect to performance and other operational parameters such as noise levels. In one example, the flow control device 41 defines a nominal converged position for the nozzle exit area 40 at cruise and climb conditions, and radially opens relative thereto to define a diverged position for other flight conditions. The flow control device 41 provides an approximately 20% change in the exit nozzle area 40.

In one example, the flow control device 41 includes multiple hinged flaps 42 arranged circumferentially about the rear of the fan nacelle 34. The hinged flaps 42 can be actuated independently and/or in groups using segments 44. In one example, the segments 44 and each hinged flap 42 can be moved angularly using actuators 46. The segments 44 are guided by tracks 48 in one example.

Figure 3:
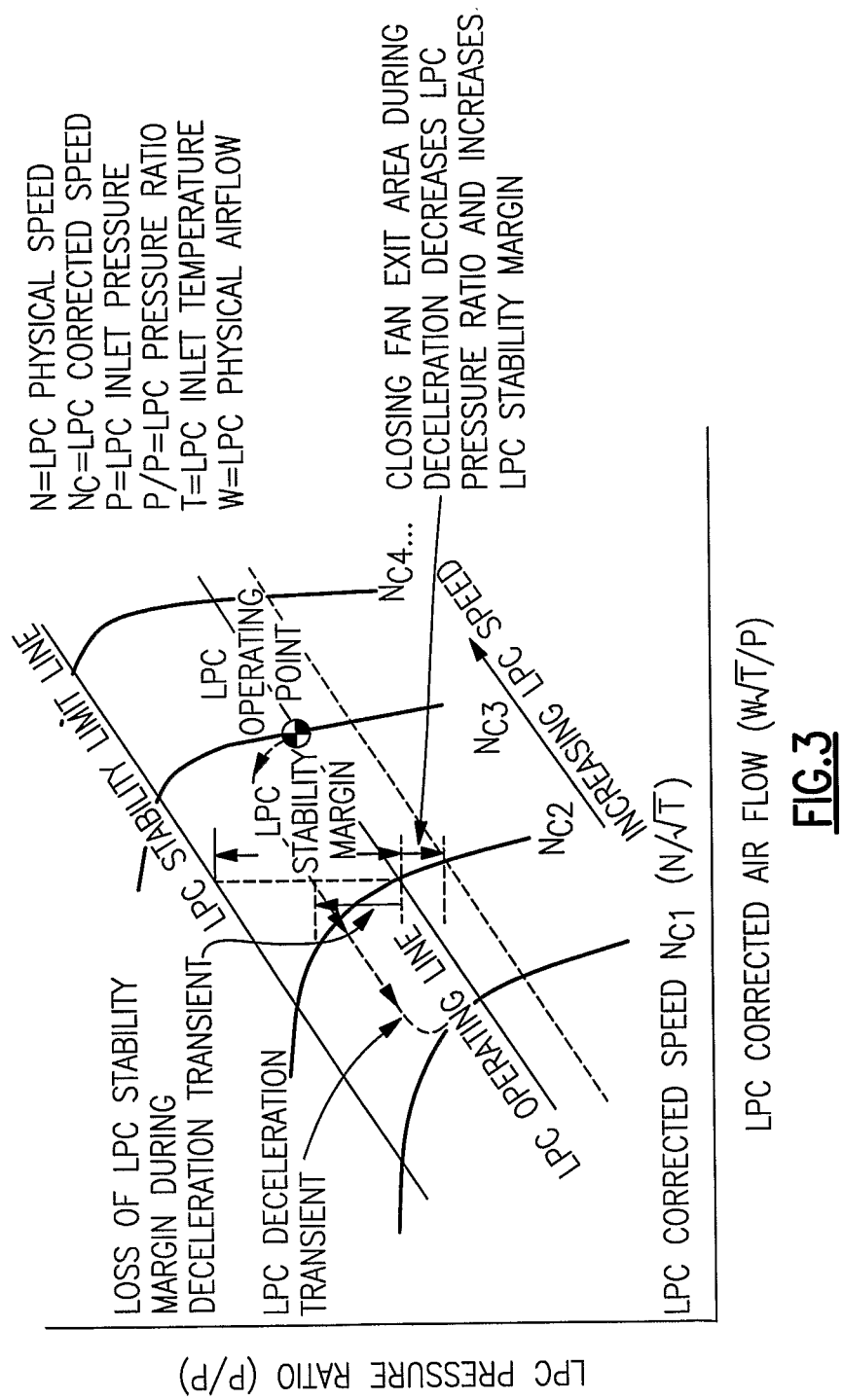
FIG. 3 is an example low pressure compressor performance map.

The low pressure compressor 16 operates at a set of conditions that can be represented by an operating point on a low pressure compressor performance map shown in FIG. 3. The operating point is affected by the speed N of the low spool 14, a pressure P and temperature T entering the low pressure compressor 16, a pressure ratio P/P across the low pressure compressor 16 and the airflow W through the low pressure compressor 16. The low pressure compressor 16 has a stability or safety margin within which the low pressure compressor should operate. The operational line must be managed to stay within the stability margin. Reaching an undesired stability margin can result in a stall or surge condition. Undesired stability margins for the low pressure compressor 16 can occur during an engine deceleration during which the low pressure compressor 16 pressure ratio increases. The increase in low pressure compressor pressure ratio is caused by the deceleration of the low spool 14 while the high spool 24 continues to pressurize the low pressure compressor 16, which results in a higher than desired differential pressure across the low pressure compressor 16.

The flow control device 41 is used to manage the operating line of the low pressure compressor 16 to maintain a desired stability margin. A controller 50 communicates with input and output pressure sensors 52, 54 that detect the turbofan discharge and low pressure compressor discharge pressures in one example. From the discharge pressures, the controller 50 can determine the pressure ratio across the low pressure compressor 16. It should be understood that the low pressure compressor pressure ratio can be determined by other suitable methods. A speed sensor 56 communicates with the controller 50 to provide the low spool speed. A throttle position sensor 58 communicates with the controller 50 to provide the throttle position.

Figure 2:
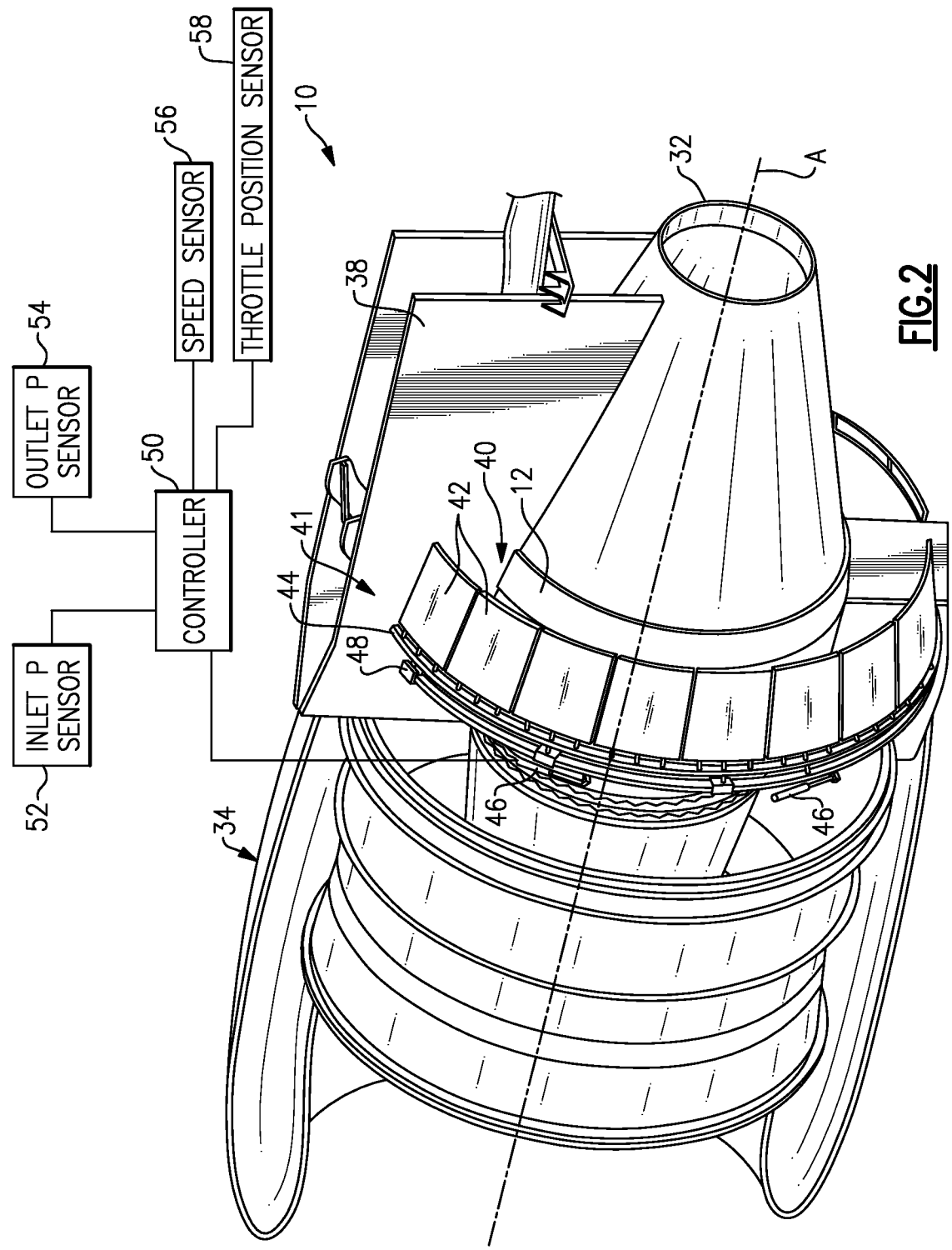
FIG. 2 is a partially broken perspective view of the turbofan engine shown in FIG. 1.

In one example, the controller 50 is programmed to determine the stability margin from the sensors 52, 54, 56, 58. Referring to FIG. 2, the controller 50 commands the actuator 46 to close the flaps 42 (physically decreasing the nozzle exit area in the example) when an undesired stability margin is detected, which increases the fan discharge pressure. This results in a desired pressure ratio and lower differential pressure across the low pressure compressor 16. Effectively decreasing the nozzle exit area increases the backpressure on the turbofan 20 and reduces the low pressure compressor 16 pressure ratio. Accordingly, a stall or surge condition can be avoided during engine deceleration.

Although an example embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbofan engine control system for managing a low pressure compressor operating line comprising:
   a low spool including a low pressure compressor housed in a core nacelle;
   a high spool rotatable relative to the low spool, the high spool supporting a high pressure compressor downstream from the low pressure compressor;
   inlet and outlet pressure sensors respectively arranged on inlet and outlet sides of the low pressure compressor;
   a turbofan coupled to the low spool;
   a fan nacelle surrounding the turbofan and core nacelle and providing a bypass flow path having a nozzle exit area; and
   a controller programmed to effectively change the nozzle exit area in response to an undesired stability margin for the low pressure compressor, the inlet and outlet pressure sensors in communication with the controller, which is programmed to determine the undesired stability margin corresponding to a pressure ratio across the low pressure compressor using low pressure compressor inlet and outlet pressures sensed by the inlet and outlet pressure sensors.

2. The turbofan engine control system according to claim 1, wherein the undesired stability margin is generated during an engine deceleration.

3. The turbofan engine control system according to claim 2, wherein the undesired stability margin is generated by a deceleration of the low spool.

4. The turbofan engine control system according to claim 1, wherein the inlet and outlet pressure sensors are in communication with the controller, the controller programmed to determine the undesired stability margin from the inlet and outlet pressure sensors.

5. The turbofan engine control system according to claim 4, comprising a speed sensor in communication with the controller, the controller programmed to determine the undesired stability margin from the speed sensor.

6. The turbofan engine control system according to claim 1, wherein a gear train is driven by the low spool and is interconnected between the low pressure compressor and the turbofan.

7. A turbofan engine control system for managing a low pressure compressor operating line comprising:
   a low spool including a low pressure compressor housed in a core nacelle;
   inlet and outlet pressure sensors respectively arranged on inlet and outlet sides of the low pressure compressor;
   a turbofan coupled to the low spool;
   a fan nacelle surrounding the turbofan and core nacelle and providing a bypass flow path having a nozzle exit area;
   a controller programmed to effectively change the nozzle exit area in response to an undesired stability margin for the low pressure compressor, the inlet and outlet pressure sensors in communication with the controller, which is programmed to determine the undesired stability margin corresponding to a pressure ratio across the low pressure compressor using low pressure compressor inlet and outlet pressures sensed by the inlet and outlet pressure sensors; and a flow control device in communication with the controller, the controller programmed to command the flow control device to effectively decrease the nozzle exit area in response to the undesired stability margin.

8. The turbofan engine control system according to claim 7, wherein the flow control device is adapted to decrease the physical nozzle exit area in response to the undesired stability margin.

9. The turbofan engine control system according to claim 8, wherein the flow control device is adapted to close flaps arranged around a perimeter of the bypass flow path to decrease the physical nozzle exit area.

10. The turbofan engine control system according to claim 8, wherein an actuator is in communication with the controller, the controller programmed to command the actuator to decrease the physical nozzle exit area.

11. The turbofan engine control system according to claim 7, comprising a throttle position sensor in communication with the controller, the controller programmed to determine the undesired stability margin from the throttle position sensor.

12. A method of managing a turbofan engine low pressure compressor operating line, the method comprising the steps of:

providing a multi spool arrangement having a low spool including a low pressure compressor, a high spool rotatable relative to the low spool and supporting a high pressure compressor downstream form the low pressure compressor, and a turbofan coupled to the low spool;

providing inlet and outlet pressure sensors respectively arranged on inlet and outlet sides of the low pressure compressor;

detecting at least one of a low pressure compressor pressure ratio, and a low spool speed associated with the low spool, and a throttle position;

determining an undesired low pressure compressor stability margin from the detecting step; and effectively changing a nozzle exit area of a bypass flow path in response to the undesired low pressure compressor stability margin.

13. The method according to claim 12, wherein the step of effectively changing the nozzle exit area includes effectively decreasing the nozzle exit area.

14. The method according to claim 13, wherein the step of effectively changing the nozzle exit area includes physically decreasing the nozzle exit area provided between core and fan nacelles.

15. The method according to claim 12, wherein the undesired low pressure compressor stability margin occurs during an engine deceleration.

\* \* \* \* \*